United States Patent
Jaskol et al.

(10) Patent No.: US 7,947,943 B2
(45) Date of Patent: May 24, 2011

(54) PAWL AND RATCHET ASSEMBLY ADAPTED FOR INDIRECT SENSING OF PROPER OPERATION

(75) Inventors: James K. Jaskol, Lawndale, CA (US); Jason C. Tomlin, Anaheim Hills, CA (US); Kristin Lynn Athans, Trabuco Canyon, CA (US); Kwok Wah James Wong, Walnut, CA (US); Edward Yeh, Diamond Bar, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1019 days.

(21) Appl. No.: 11/760,161

(22) Filed: Jun. 8, 2007

(65) Prior Publication Data

US 2008/0303260 A1   Dec. 11, 2008

(51) Int. Cl.
G05B 23/00   (2006.01)
(52) U.S. Cl. .................................. 250/215; 188/2 D
(58) Field of Classification Search ............... 250/215; 188/2 D
See application file for complete search history.

(56) References Cited

U.S. PATENT DOCUMENTS

| | | | |
|---|---|---|---|
| 4,257,324 A | 3/1981 | Stefansson et al. | |
| 4,385,737 A | 5/1983 | Gulette et al. | |
| 4,392,620 A | 7/1983 | Takada | |
| 5,529,382 A | 6/1996 | Burkat | |
| 5,622,327 A * | 4/1997 | Heath et al. ................ | 242/383.4 |
| 5,646,611 A | 7/1997 | Dailey et al. | |
| 5,921,071 A | 7/1999 | Paquet et al. | |
| 6,431,525 B1 | 8/2002 | Roll | |
| 6,491,352 B2 | 12/2002 | Engle | |
| 6,520,307 B2 | 2/2003 | Becker et al. | |
| 6,637,341 B2 | 10/2003 | Kroon et al. | |
| 6,698,723 B1 | 3/2004 | Antonini | |
| 6,702,219 B2 | 3/2004 | Tanji | |
| 6,755,284 B2 * | 6/2004 | Revelis et al. ................ | 188/2 D |
| 6,829,952 B2 | 12/2004 | Stanley et al. | |
| 6,831,537 B2 | 12/2004 | Haas et al. | |
| 7,002,457 B2 | 2/2006 | Stevenson et al. | |
| 7,159,686 B2 | 1/2007 | Martinez et al. | |
| 7,166,032 B2 | 1/2007 | Smith et al. | |
| 2003/0205931 A1 | 11/2003 | Muller et al. | |
| 2006/0237570 A1 | 10/2006 | Takao et al. | |

* cited by examiner

*Primary Examiner* — Seung C Sohn
(74) *Attorney, Agent, or Firm* — Marsh Fischmann & Breyfogle LLP; Kent A. Lembke (57) ABSTRACT

An apparatus for monitoring operation of a ratchet-based locking mechanism. The apparatus includes a ratchet and a pawl with a protrusion for engaging the ratchet during contact between the pawl and the ratchet teeth. The apparatus includes an elongated member or amplification arm extending from the pawl. The elongated member includes a base linked to the pawl and a tip spaced apart from the base. The elongated member is linked to the pawl to move when the pawl is displaced relative to the ratchet. The apparatus includes a sensor sensing displacement of the tip of the elongated member, which is greater than the pawl displacement, and the apparatus includes a processor monitoring displacement of the elongated member to indirectly monitor movement of the pawl protrusion during forward motion of the ratchet to verify the locking mechanism is working properly and the pawl will engage the ratchet to block reverse motion.

19 Claims, 5 Drawing Sheets

PAWL AND RATCHET ASSEMBLY ADAPTED FOR INDIRECT SENSING OF PROPER OPERATION

BACKGROUND OF THE INVENTION

1. Field of the Invention

The present invention relates, in general, to monitoring proper operation of a latching or locking mechanism such as ratchet and pawl, and, more particularly, to systems and methods for sensing proper operation of a pawl and ratchet assembly including detecting proper insertion or travel of a pawl into a valley between teeth of the ratchet such that the pawl blocks movement of the ratchet in a particular direction (e.g., allows forward motion but limits reverse motion). For example, a passenger restraint mechanism or a safety restraint may include a pawl and ratchet assembly according to the invention that provides monitoring of proper locking or latching of the restraint.

2. Relevant Background

Amusement parks continue to be popular worldwide with hundreds of millions of people visiting the parks each year. Park operators seek new designs for extreme or thrill rides that attract people to their parks, but safe operation of the new and existing rides is always a highest priority design requirement. For example, roller coasters and other thrill rides apply significant amounts of force (e.g., g-forces) on the passenger with numerous twists, turns, drops, and loops at speeds of up to 100 miles per hour or more. Ride designers or engineers are given the task of producing unique and more exciting rides that are safe and that are also less costly to operate and maintain.

Passenger restraints are one of the most important features in ride safety as these restraints comfortably and securely keep passengers in place in a seat or within a ride car or compartment. Ride engineers continue to evaluate new kinds of passenger restraint systems that meet safety requirements while being less expensive to operate and maintain. Maintenance of an amusement park ride including maintaining passenger restraints often is a tedious process including daily, monthly, and yearly inspections. Even the daily inspections may take hours to perform as an inspector not only verifies proper operation of the ride but at least periodically performs an extensive inspection of the ride track and other ride machinery including components of passenger restraint systems (e.g., inspect for unacceptable wear of parts especially load bearing parts and mating components, for proper operation of moving parts such as springs and for proper tightening of fasteners). To reduce the costs associated with maintenance, ride designers continue to look for ways to automate these inspections and otherwise simplify the inspectors' tasks.

During operation of a ride, a passenger restraint is typically placed across the lap or over the shoulder of a ride passenger, and a mechanism is typically provided as part of the restraint that locks or latches the restraint in place during operation of the ride. In some cases, ride designers are required to comply with governmental regulations or with standards that establish criteria for the design of amusement rides including criteria regarding passenger restraints. For example, many rides are designed to meet or exceed criteria provided in the ASTM F2291 standard, which is entitled "Standard Practice for Design of Amusement Rides and Devices." With regard to passenger restraints, ASTM F2291 calls for rides that create accelerations that lift guests or passengers out of their seats (i.e., Class 5 restraints) to be designed such that failure of a restraint to properly operate prevents the next ride cycle from starting. Proper operation for passenger restraints includes the locking or latching mechanism properly engaging to prevent the restraint from opening during the ride cycle, and, hence, monitoring operation of a passenger restraint involves determining whether the locking or latching mechanism has engaged or is secured.

For some passenger restraint designs, sensors are used to identify whether the passenger restraints are properly secured. A direct sensor such as a proximity sensor (e.g., a Hall effect sensor), a displacement sensor, a pressure sensor, a force sensor, or the like may be used to determine when the mechanism is operating properly such as when a tongue latches inside a buckle, and the sensor transmits a signal to a controller or a restraint monitoring module running on a computer that acts to process sensor signals to monitor proper operation of all the restraints on a particular ride. If a sensor indicates that a restraint did not work correctly, the controller detects the problem and prevents the ride operating system from beginning the next ride cycle. For example, direct sensors (i.e., a sensor associated with each restraint that directly monitors engagement of the locking or latching mechanism components) are utilized with hydraulic passenger restraints to verify proper operation of the restraint. Use of hydraulic restraints in some implementations has created some operating issues. For example, their use may involve a ride operator having to tug or pull on each restraint after it is positioned over a passenger relatively hard to generate enough hydraulic pressure in the restraint structure such that the sensor signal indicates to the controller that the restraint is properly secured or engaged, and the repeated tugging or pulling motion can be physically demanding for some operators and generally delays the start of the next ride cycle while the operator checks each restraint. Such tugging or physical verification is present in other restraints that do not utilize hydraulics. With these issues in mind, ride designers continue to evaluate other mechanisms for securing or locking passenger restraints.

Ratchets are convenient devices for ride designers to use in passenger restraint assemblies because they rotate in one direction but not in the other when a pawl engages teeth of the ratchet or the ratchet wheel. For example, an over-the-shoulder restraint may include a pawl and ratchet assembly to provide the latching and locking mechanism for the restraint. During operation, the passenger pulls the restraint down, and, during this motion, a spring or other actuator urges the pawl into engagement with the teeth. As a result, the passenger moves the restraint and the ratchet in one direction (e.g., downward), but the passenger and ride forces cannot push or move the restraint and the ratchet in the other direction because the pawl engages the ratchet teeth to stop motion in this direction. Pawl and ratchet assemblies are also relatively inexpensive to manufacture and maintain, and these and other characteristics make ratchets attractive for use in restraints and similar applications.

Pawl and ratchet assemblies have been widely adopted in the past and continue to be popular for less demanding applications. However, recent regulations (e.g., the ASTM 2291 standard) have limited their use for demanding applications (e.g., for use as part of Class 5 restraints) because it is often difficult to monitor their proper operation. For example, it is difficult to provide sensors within a pawl and ratchet assembly to directly monitor engagement of the pawl with the ratchet teeth. This has made it impractical to use a computer-based system to automatically monitor ratchets provided in restraints for proper operation based on sensor signals, and, hence, pawl and ratchet assemblies have not been used in rides and other applications where guests or passengers may be lifted out of their seats due to accelerations and g-forces generated by the ride or application (e.g., systems where the restraints have to meet ASTM F2291 criteria on monitoring proper engagement or similar design requirements). To be confident that the restraint will adequately prevent reverse motion when needed, a ride designer needs a way to verify that the pawl can move freely, as it passes over the teeth in the forward motion of the ratchet, into the valley or recessed surface between two adjacent teeth of a ratchet to resist reverse motion if movement of the ratchet is attempted in this second or reverse motion. In other words, because ratchets do not lock, the designer needs another way to monitor that a pawl and ratchet assembly will work properly to enforce one-way motion before starting a ride using such assemblies in the passenger restraints. Additionally, for rides where the direction of the g-loading changes throughout the ride, the ride designer needs to be assured that the pawl remains pressed into the valley between the teeth regardless of the g-loading direction. In many cases, a spring or resilient member is used for biasing the pawl into engagement in a valley between adjacent teeth, and, during operation of the ride, it is desirable to monitor continued operation or failure of the spring such as to verify that the ratchet will continue to work for various g-loading directions.

One of the main reasons that it is difficult to provide a sensor for direct monitoring of operating status of a pawl and ratchet assembly is that actual pawl movement or travel at the point of engagement with the ratchet teeth (i.e., the ratchet engagement portion of the pawl) is relatively small. As a result, small variations in pawl travel that may be caused, for example, by debris or other mechanical problems are difficult to identify when compared with the normally narrow range of motion of the ratchet engagement portion of the pawl. To directly monitor the range of motion of the ratchet engagement portion of the pawl, it may be possible to mount a high precision sensor at or near the point of engagement, but this is often impractical due to small physical clearances for placing a sensor within the assembly and due to increased costs. Further, accurate monitoring requires that such sensors be precisely adjusted to achieve desirable results, which places additional burdens on the ride operators at initial installation and during ongoing maintenance as the sensors may need to be periodically calibrated and tested. Alternatively, it has been suggested that much larger ratchets may be used as part of restraints such that the ratchet engagement portion of the pawl has a longer travel path to be pressed into the valley between two ratchet teeth. Larger ratchets are also generally not practical in many applications as the ratchets cannot physically fit within the housing or other physical limitations of the ride design, and such ratchets often significantly increase the weight of the ride.

Passenger restraints of all kind may be designed to include pawl and ratchet assemblies and exemplary passenger restraints include over-the-shoulder restraints, shoulder or lap belts, bar, or other restraints for amusement park rides, automobiles, airplanes, trains, ski-chair lifts, and the like. Additionally, there are other applications where it is desirable to monitor proper operation of a locking or latching mechanism such as a pawl and ratchet assembly. For example, the shipping industry utilizes tie downs to secure cargo during transport by ship, train, truck, airplane, or the like, and the tie downs are secured to avoid excessive movement of the cargo when forces are applied. In these cases, pawl and ratchet assemblies may be utilized, and an operator needs to verify proper engagement and operability of any biasing components. As another example, in factory environments, pawl and ratchet assemblies may be used to limit conveyor belt or other moving part motion to a single direction, e.g., a conveyor belt cannot roll backwards. In these settings, as with passenger restraints, it may be difficult to use sensors to directly monitor proper engagement or operation of the assemblies. Ratchets are also used in business machines such as copiers and printers, and, while safety often is not an issue, it is desirable to monitor continued proper operation of pawl and ratchet assemblies to quantify use and provide diagnostic monitoring of the machines and direct monitoring of small pawl movements is challenging.

SUMMARY OF THE INVENTION

The present invention addresses the above problems by providing a pawl and ratchet assembly and monitoring methods associated with use of such assembly. The pawl and ratchet assembly is uniquely configured for sensing displacement or movement of the pawl to properly engage the ratchet. The assembly includes a pawl extension or arm that extends out from the pawl, and a sensor is provided to sense when the pawl extension moves from a first position to a second position with the first position being associated with the pawl being disengaged with the ratchet and the second position being associated with the pawl properly engaging the ratchet. For example, a proximity sensor such as a photoelectric sensor or the like senses when a portion of the pawl extension that is distal to the pawl body is displaced a particular distance at which point the pawl has been urged into contact with one or more teeth or surfaces of the ratchet. In this manner, a relatively small amount of travel by the portion of the pawl that engages the ratchet is amplified to an "amplified distance" or "amplified pawl travel" that is more easily sensed by a conventional industrial sensor, e.g., travel may be amplified by up to 50 percent or more with some embodiments providing amplification of 2 to 5 times or more such as 0.125 inches of pawl travel being amplified up to about 0.5 to 1.25 inches or more. The sensor is an indirect sensor in that it used to ascertain when the pawl engages the ratchet without having to directly sense movement of the portion of the pawl that is urged into contact with the ratchet, e.g., sense or monitor movement of a first portion of the pawl by monitoring a second portion mechanically linked to the first portion.

More particularly, an apparatus is provided for monitoring operation of a ratchet-type locking mechanism. The apparatus includes a ratchet with a recessed surface on a face such as a valley between two adjacent teeth or similar surface. A pawl is provided that includes a protrusion for engaging the ratchet during contact between the pawl and the recessed surface. The apparatus further includes an elongated member (e.g., an amplification member, an extension, an arm, or the like) extending outward from the pawl. The elongated member includes a base linked or attached to the pawl and a tip or head that is spaced apart from the base. The elongated member is mechanically linked to the pawl such that it moves when the pawl protrusion is displaced relative to the recessed surface of the ratchet, e.g., when the pawl moves to engage the ratchet the elongated member and its tip or head concurrently move.

The apparatus further includes a sensor that operates to sense displacement of the tip of the elongated member, which is more readily achieved because the displacement of the tip is greater than the displacement of the pawl protrusion. For example, the displacement of the tip may be greater than the displacement of the pawl protrusion by an amplification factor of at least about 1.5 (i.e., tip displacement is at least about 50 percent greater) and often at least about 3 up to 5 times or more, which may be useful for indirectly sensing movement of the pawl protrusion that may be less than about 0.25 inches. The elongated member may be at least about 3 inches in length to provide desired amplification and relocation of the sensor target (e.g., spacing the tip or head a distance away from the moving ratchets and pawls) and sometimes is up to about 2 feet or more in length to achieve a desired amplification and/or target relocation. A monitoring module running on a computer may be provided to receive the sensor signals and to detect proper engagement between the pawl and ratchet based on this indirect monitoring. A biasing member such as a spring device may be used to urge the pawl into contact with the ratchet and the monitoring module may detect potential failure of the biasing member when no signal is received from the sensor. The apparatus may readily be used in a locking mechanism of a passenger restraint system or other system or apparatus that uses a ratchet to control motion.

According to another aspect of the invention, a method is provided for monitoring operation of a pawl and ratchet assembly, and in some cases, this method is used to monitor operation of a passenger restraint such as may be provided in an amusement park ride. The method includes biasing a pawl toward a ratchet so that a first portion of the pawl is displaced a first distance to engage at least one tooth of the ratchet. The method also includes monitoring a second portion of the pawl with a sensor, such as a photoelectric sensor, to detect displacement of the second portion of the pawl that is greater than a second distance. A signal is generated by the sensor when the monitoring detects displacement of the second portion that is greater than the second distance, which is indicative of proper engagement of the first portion of the pawl with the ratchet. The second distance provides an amplified measure of the first distance, and it is greater than the first distance by at least about 50 percent up to 500 percent or more (e.g., by amplification factors of 1.5 to 5 or more). To achieve such amplification, the second portion of the pawl may include an arm that extends from a body of the pawl a particular distance such as at least about 3 inches up to 24 inches or more. The monitoring method may further include determining failure to receive an output signal from the sensor (i.e., the sensor did not detect displacement of the second portion greater than the second distance). Yet further, the method may include determining a magnitude or amount of movement of the ratchet based on the signals such as by counting the number of received signals to determine which tooth of the ratchet is adjacent to or engaged by the first portion of the pawl.

DETAILED DESCRIPTION OF THE PREFERRED EMBODIMENTS

Briefly, embodiments of the present invention are directed to methods and systems for monitoring ratchets for proper operation. Particularly, pawl and ratchet assemblies are described in the following paragraphs and accompanying figures that are configured to provide for monitoring of adequate engagement of a pawl with teeth of a ratchet through indirect sensing of pawl displacement. To this end, a pawl extension or arm is mounted onto a pawl or is provided as part of a pawl. Because the extension or arm is mechanically linked to the pawl, movement or travel of the pawl causes the extension or arm to also be displaced or to move through a travel path. A sensor is provided proximate to an end or head of the extension or arm that is distal to the pawl or pawl body, and during operation, the sensor detects when the end or head of the extension or arm travels a particular distance (i.e., amplified distance or amplified pawl travel) that corresponds to the pawl being displaced a distance corresponding with proper operation of the pawl and ratchet assembly (i.e., adequate pawl engagement with the ratchet).

Figure 1:
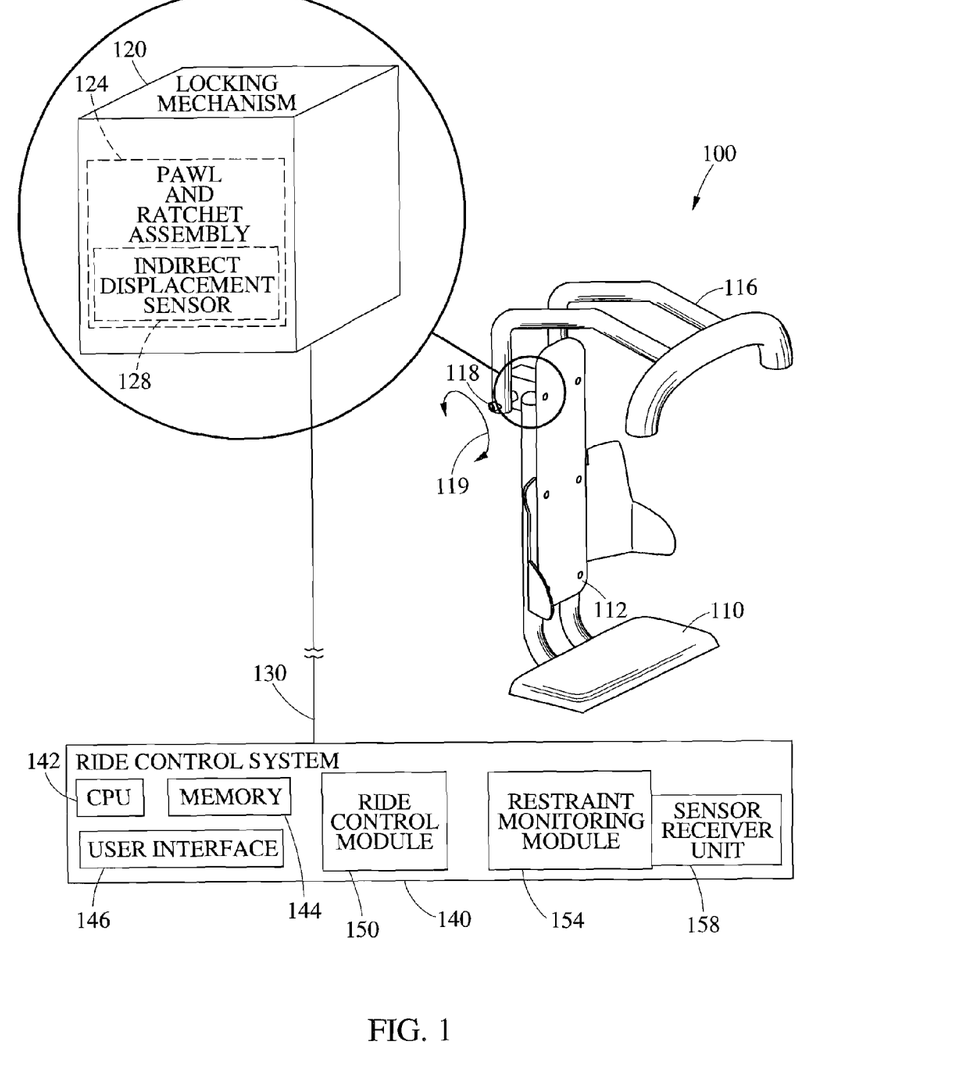
FIG. 1 is perspective view of a passenger restraint system including functional block portions useful for illustrating a pawl and ratchet assembly as it may be provided in the restraint system.

The pawl and ratchet assemblies of the invention are well suited for use in passenger restraint systems, and restraint systems that include these pawl and ratchet assemblies are considered within the breadth of the present description. FIG. 1 illustrates one exemplary passenger restraint assembly 100 of the invention that may include a pawl and ratchet assembly to allow indirect sensing of proper ratchet operation. The assembly 100 is configured generally for use in amusement park rides, but the terms "passenger restraint," "restraint assembly," or the like are intended to have more general meanings to including nearly any safety restraint that is latched or locked and used to restrain movement of a passenger in a ride, a vehicle, a ski-lift chair, or other application. Further, the pawl and ratchet assemblies of the invention are useful in other systems in which it is desirable to use a ratchet to provide secure directional control such as business machines, tie downs and other securing apparatus, conveyor belts and other factory and manufacturing applications, and the like. The monitoring concepts described herein are useful for performing diagnostics in addition to providing enhanced safety when using pawl and ratchet assemblies. These additional applications and apparatus are also considered within the breadth of this description. Additionally, the description generally emphasizes restraint systems and pawl and ratchet assemblies in FIGS. 1-3, but the invention is also directed to the described techniques and methods used for ascertaining proper operation of a pawl and ratchet assembly (or of a restraint that uses such an assembly) including indirect sensing of displacement of the ratchet engaging portion of the pawl.

FIG. 1 illustrates an embodiment of a passenger restraint assembly 100 configured for monitoring of proper operation of the restraint 116. The assembly 100 includes a seat 110, a back support 112, and an over-the-shoulder restraint 116. The invention, of course, is not limited to such a restraint 116 and is useful for nearly any restraint for which it is desirable to verify proper operation of the restraint or its locking/latching mechanism such as a lap-type restraint, a belt-type restraint, restraints configured for single passengers or multiple passengers, and other arrangements known to those skilled in the arts. When a passenger or guest is seated in seat 110 and a next ride cycle is about to be initiated, the restraint 116 is typically pulled down by the passenger as shown by rotation 119 about pin or axle 118, but in some cases, such movement of the restraint 116 is automated. Movement of the restraint 116 from a rest or disengaged position to a locked or engaged position is controlled or guided by the locking mechanism 120 linked to pin or axle 118, and in some embodiments, the shaft, axle, pin, or similar member 118 is directly or indirectly coupled with a pawl and ratchet assembly 124 (e.g., the ratchet or ratchet wheel may be press fit or otherwise attached to the pin or axle 118 to turn with pin or axle as the pawl is pressed by a biasing member such as a spring or the like against the teeth of the ratchet or ratchet wheel).

An indirect displacement sensor 128 is provided in the pawl and ratchet assembly 124 to monitor displacement or travel of a first portion of the assembly 124 that is indicative of a desired amount of travel or displacement of a second portion of the assembly 124. For example, the sensor 128 may monitor movement of a pawl extension or arm that may take the shape of a lever, a stick, a rod, a bar, or the like to ascertain when the portion of the pawl that contacts the ratchet has traveled a distance indicative of proper engagement between the pawl and teeth of the ratchet. As will be explained in detail with reference to FIGS. 2A-2C, the extension is linked to the portion of the pawl that contacts the ratchet and its configuration, e.g., its length, provides substantial amplification of the pawl travel, and the pawl travel amplification allows the indirect displacement sensor to be implemented with a conventional sensor such as a proximity sensor or displacement sensor (e.g., a photoelectric sensor or the like). Further, the use of an indirect sensor 128 allows the engaging portion of the pawl and the toothed face of the ratchet to be designed without modification to support direct sensing (e.g., to provide space for placement of a sensor or with enlarged dimensions to simplify direct sensing). During operation, the indirect displacement sensor 128 detects or senses when the monitored or linked portion of the pawl and ratchet assembly 124 has traveled a particular distance or amount of travel, and, in response, the sensor 128 transmits a signal (e.g., an electric signal) on line 130 for processing by ride control system 140.

The ride control system 140 may comprise a computer or an electronic system configured for processing sensor signals and responding by controlling operation of the ride in which the restraint 116 is provided (e.g., to control start of a next ride cycle or the like). The ride control system 140 may take many forms to provide these signal processing and control functions, and the invention is not limited to a particular configuration of the control system 140. As shown, the system 140 includes a processor 142, memory 144, and a user interface 146 for allowing a ride operator to monitor ride operations and to enter or select control settings and commands. The system 140 further includes a ride control module 150 that may be software, firmware, and/or hardware that controls operation of a ride and may control release or unlocking of the locking mechanism 120 at the termination or end of a ride cycle (e.g., to disengage a pawl from a ratchet wheel within the pawl and ratchet assembly 124) to allow a passenger or guest to exit the restraint system 100 or to lift the restraint 116. The ride control module 150 may also prevent or block the start of a next ride cycle when the control system 140 cannot verify proper operation of the restraint 116 or, more accurately, the proper operation of the locking mechanism 120.

To this end, a restraint-monitoring module 154 is provided in the control system 140 to process signals that are received by a sensor-receiving unit 158 to monitor and/or verify proper operation of the pawl and ratchet assembly 124 in the locking mechanism 120. Proper operation of the pawl and ratchet assembly 124 includes a ratchet or ratchet wheel rotating with the shaft 118 to allow the restraint 116 to be lowered over a passenger into a restraining position. At this point, the ratchet is typically blocked from reverse motion or rotation in the opposite direction (e.g., which would allow shaft 118 to rotate in the opposite direction and allow lifting the restraint 116) by positioning of an engaging portion of a pawl against one or more teeth provided on the face of the ratchet wheel. The travel of the engaging portion of the pawl is used to ascertain when engagement has occurred, and the travel is measured indirectly by the sensor 128 that operates to sense when a second portion of the pawl and ratchet assembly 124 has traveled a particular distance that may be thought of as the "amplified distance" or the "amplified pawl travel." When this occurs, a signal is sent to the sensor receiver unit 158, and the restraint monitoring module 154 processes the signal to verify that as the restraint 116 is properly positioned (such as by an operator verifying that the restraint contacts the passenger or the like) the locking mechanism 120 has properly operated (e.g., the pawl movement during the "forward" motion indicates the pawl is freely moving into the valleys between ratchet teeth as the pawl passes over the teeth which provides a confidence that the pawl will also move into a valley to prevent "reverse" motion if that is attempted). This information is shared with the ride control module 150, which may respond by starting a ride cycle. In the absence of such a signal from the sensor 128, the monitoring module 154 would determine that the locking mechanism 120 has not properly operated and this information would be passed to the control module 150 to prevent initiation of the ride cycle. In some embodiments, the sensor 128 transmits signals to indicate the presence of the extension arm and its absence (e.g., movement away from the sensor) is used to provide an indication to the monitoring module that proper operation has occurred. In other words, the receipt or lack of receipt of a signal from the sensor 128 may be used by the monitoring module 154 to monitor proper operation of the pawl and ratchet assembly 124.

The specific configuration of the ratchet or ratchet wheel and of the pawl used to engage the ratchet's teeth may vary significantly to practice the invention. For example, the ratchet may be a radial or rotating type ratchet (e.g., a wheel ratchet, a sprocket, a gear, a portion of one of these types of ratchets, or the like) or a linear or sliding type ratchet (or frame or bracket type ratchet), and the pawl may be configured to engage the ratchet due to gravity or due to a biasing member that urges a protrusion into a valley between two teeth or adjacent a tooth or into a recessed surface. Similarly, as discussed previously, the pawl and ratchet assembly concepts are readily applicable to other passenger restraint systems than that shown in FIG. 1 and to other applications in which ratchets are utilized to control movement of straps, belts, machine components, and the like. The monitoring techniques and systems may be used for amusement park restraints (Class 5 and others) to pinpoint a failure to allow for quicker repair, to detect a failure in a redundant system to control latent failures, to detect a failure soon enough to avoid operation with a failed ratchet, and/or to log failures to aid reliability analysis. The techniques and systems may also be used for other passenger restraints, for cargo restraints, tie downs, and the like, for factory environments such as monitoring ratchet controlled conveyor belts and other machines, for business and other machines using ratchets, and other applications where monitoring ratchet operation is useful.

Generally, the invention such as system 100 is used to monitor the movement of a pawl to determine that it will engage in the ratchet teeth of a ratchet or ratchet wheel when needed to prevent reverse motion. In the case of restraints, this monitoring is done while a passenger is positioning the restraint (e.g., pulling down an over-the-shoulder restraint, pulling a lap belt over their body, or the like). During that positioning, the ratchet teeth move relative to the pawl, and the indirect sensor(s) (e.g., sensor 128) and monitoring software (e.g., monitoring module 154) monitor whether the pawl falls or is urged far enough between the teeth to adequately engage the ratchet. By indirectly monitoring this motion, the ride operator is assured that the pawl engages fully or to a preset amount into the ratchet teeth to prevent reverse motion.

Figure 2A:
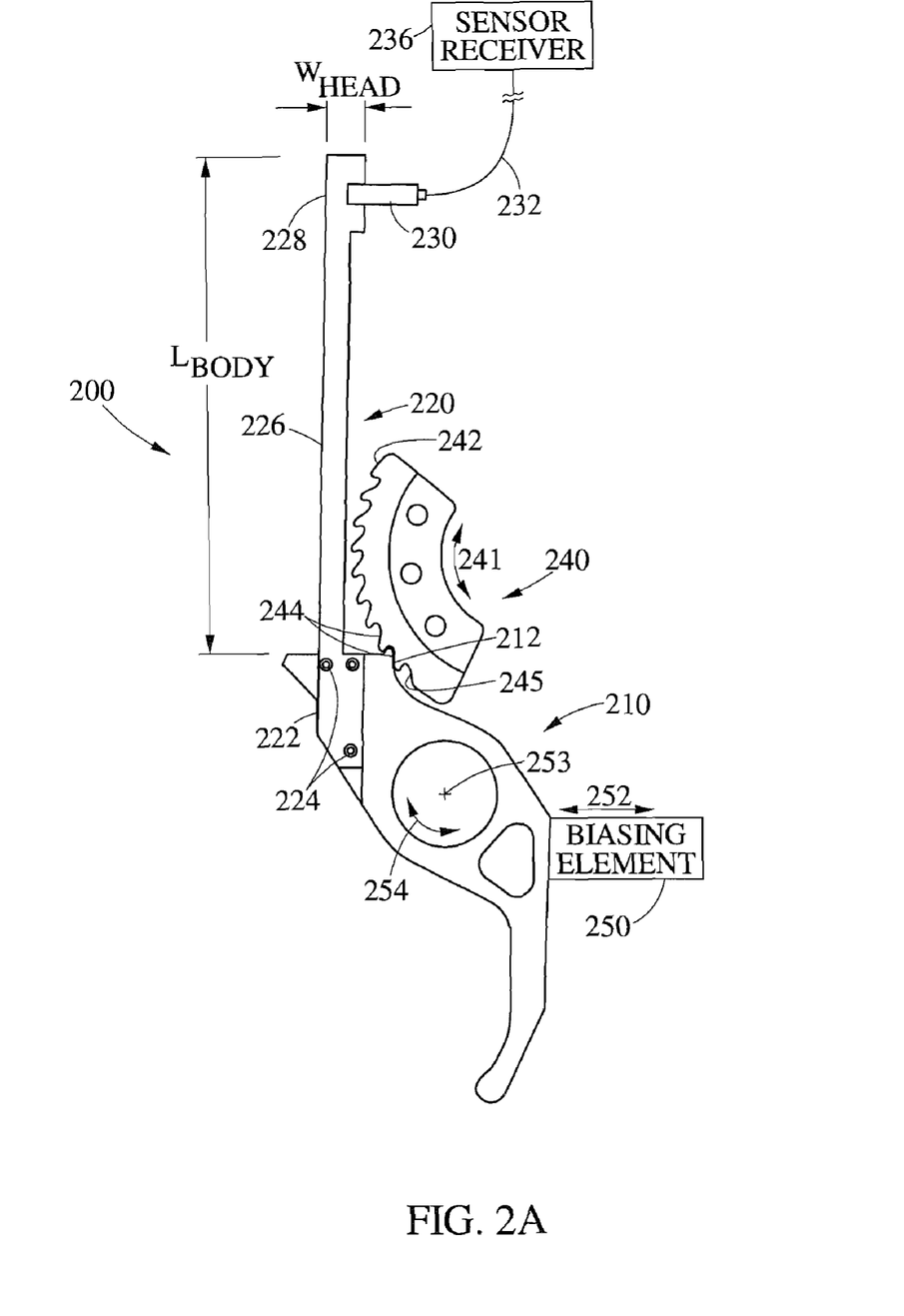
FIG. 2A illustrates a side view of a pawl and ratchet assembly according to an embodiment of the invention such as may be used in the restraint system of FIG. 1 with the pawl shown in an engaged position.
Figure 2B:
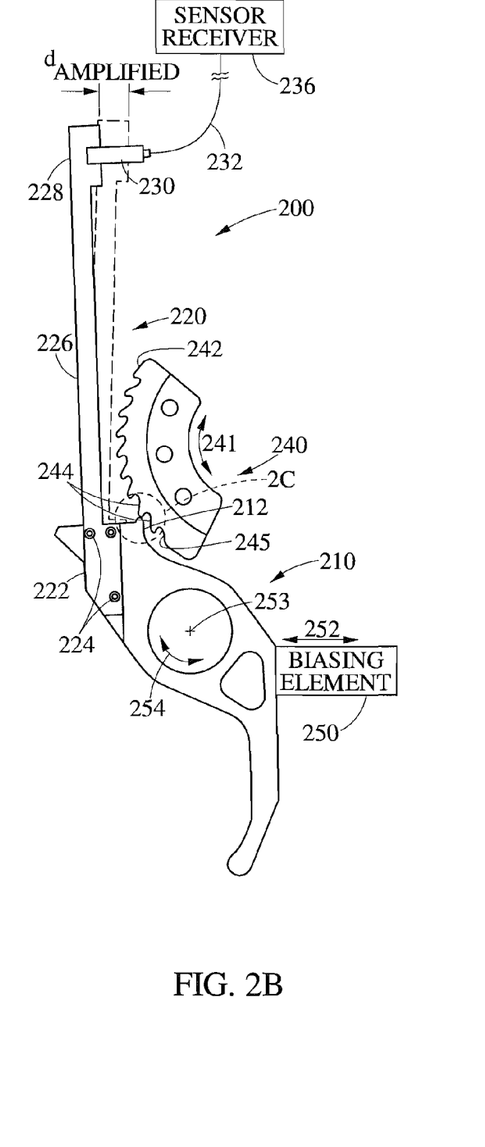
FIG. 2B illustrates a side view of the pawl and ratchet assembly of FIG. 2A with the pawl shown in a disengaged or at rest position relative to the ratchet and illustrating in dashed lines the pawl in the engaged position to better show an amplified distance or amplified displacement or travel of the pawl provided by a pawl extension or arm.
Figure 2C:
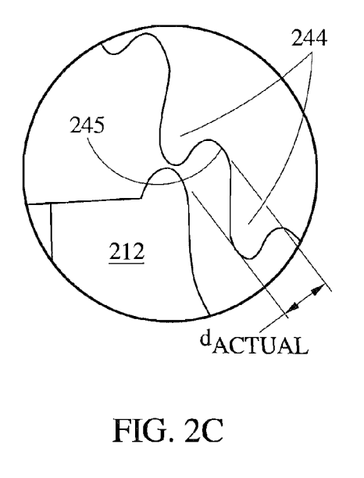
FIG. 2C illustrates an enlarged view taken from FIG. 2B of the engagement portion of the pawl and face of the ratchet showing actual distance the engagement portion of the pawl travels or is displaced to obtain full engagement with the ratchet (i.e., to contact sides of adjacent teeth as it is urged into the valley formed between the teeth)

FIGS. 2A-2C illustrate an embodiment of a pawl and ratchet assembly 200 that may be used to provide indirect sensing of pawl engagement with a ratchet. As shown, the assembly 200 includes a pawl 210, a ratchet 240, and a biasing element 250. FIG. 2A illustrates the assembly 200 with the pawl 210 in the engaged position while FIG. 2B illustrates the assembly 200 with the pawl 210 in the disengaged position (with a dashed representation showing the pawl in the engaged position in FIG. 2B). During operation, the biasing element 250, which may comprise a spring or other resilient member or the like, urges as shown at 252 the pawl 210 into contact with the ratchet 240 via rotation 254 about axis 253 (e.g., central axis of a shaft upon which the pawl 210 may be mounted). Also, during operation, the ratchet 240 may be moved or rotated as shown at 241 about its axis with the pawl 210 allowing motion in one direction (e.g., in the upward direction in the illustrated example) but blocking motion in the opposite direction (e.g., in the downward direction in the illustrated example) when the pawl 210 engages the ratchet 240 as shown in FIG. 2A, This type of operation is common in many assemblies that utilize ratchets such as the restraint system 100 of FIG. 1.

For example, the ratchet 240 is mounted to a shaft or other component that rotates as shown at 241, and this rotation 241 causes the face 242 of the ratchet 240 to move relative to the pawl 210 such that the teeth 244 also move relative to the pawl 210. The ratchet 240 is shown to be a partial wheel or segment of a wheel with an arcuate face 242, but other ratchet configurations including linear ratchets may be used for the ratchet 240. The biasing element 250 urges an engaging member or portion 212 of the pawl 210 into the recessed surface or valley 245 formed adjacent each tooth 244 (or formed by adjacent pairs of the teeth 244). Proper engagement may involve, as shown in FIG. 2A, the engaging portion 212 traveling substantially the entire depth of the valley 245, or, in some cases, a particular amount of travel of the engaging portion 212 into the valley 245 may be considered proper engagement (e.g., the travel may be associated with achievement of a mating surface between the pawl tooth 244 and engaging portion 212 to prevent reverse motion with a desired or acceptable safety margin).

The mechanical environment of this engagement between the pawl 210 and the ratchet 240 is shown in detail in FIG. 2C. As shown, the actual travel of the pawl, $d_{Actual}$, is the distance traveled to achieve a proper or acceptable amount of engagement between the engaging portion 212 and the tooth 244 as the portion 212 travels into the valley or recessed surface 245 between two teeth 244 or adjacent a single tooth 244 in some cases (e.g., ratchets may be designed with spaced apart recessed surfaces in which the pawl travels to obtain engagement and the terms "tooth" and "teeth" are intended to describe these raised surfaces or components adjacent the recessed surfaces or valleys). In this mechanical world, there are two major problems associated with monitoring when proper engagement is achieved. First, the pawl movement, $d_{Actual}$, is often too small for most sensors to detect. Second, most sensors are too large to be readily installed near the ratchet (e.g., sensor mounting is prevented by physical clearances and/or by a desire to avoid interference with movement of the ratchet 240 and/or pawl 210).

To address both of these problems, the pawl and ratchet assembly 200 is configured to provide amplification of the pawl movement, $d_{Actual}$, to allow a sensor 230 to readily detect movement of a part or component linked to the pawl 210 (i.e., to the engaging portion 212). Such indirect sensing generally includes monitoring a second part of the assembly 200 that is linked to the engaging portion 212 to move with or in response to movement by the pawl 210. In the illustrated embodiment of FIGS. 2A-2C, a movement amplifier is provided in the form of a pawl extension or arm 220 that has its base 222 mounted with fasteners 224 to the body of the pawl 210 (e.g., near the engaging portion 212 although this is not a requirement). The extension 220 includes a body 226 that extends outward from the body of the pawl 210 a length, $L_{Body}$, to a head 228 distal to the extension base 222. The elongated body 226 is relatively narrow in this embodiment and terminates at the head 228, which has a different width, $W_{Head}$, which facilitates ready monitoring by sensor 230. The amplifier or extension 220 is configured to amplify the pawl movement, $d_{Actual}$, to the extent that it is easily detected by the sensor 230, which transmits a signal to sensor receiver 236 over line 232 when a particular amount of amplified movement or travel, $d_{Amplified}$, is detected. The length of the body, $L_{Body}$, and its shape and size may be varied to suit the physical restrictions (e.g., amount of space available for the extension 220) but in some embodiments the length, $L_{Body}$, is selected from the range of about 1 to 24 inches but smaller and larger bodies 226 may be used to achieve a desired amplification. In one implementation, the actual pawl travel was about 0.125 inches and the achieved amplification was in the range of about 3.5 to 4 such that the amplified movement or travel was about 0.5 inches. As will be appreciated, the use of the extension or amplifier 220 not only amplifies the pawl movement but it also relocates the sensor target (i.e., head 228) from the pawl tip 212 to the head or tip 228 of the amplifier or extension 220 such that the sensor(s) 230 can more easily be installed without interfering with operation of the assembly 200.

The sensor 230 may take a number of forms to practice the invention as long as it performs the function of detecting or monitoring movement of the extension 220 such as the head or tip 228 as shown in FIGS. 2A and 2B. In one embodiment, photoelectric sensing is utilized and the sensor 230 uses a beam of light to detect the presence (or absence) of the head 228. For example, one embodiment of the sensor 230 is an optical fork sensor that detects when the head moves into the fork and blocks the light from an emitter from the sensor's receiver. The light source of the emitter may be a laser, an LED, or the like, and the receiver of the sensor 230 converts the light to a signal (e.g., an electrical voltage) and stops sending the signal when the head 228 blocks the light. In other cases, the sensor 230 may be implemented as a "beam break" sensor that is designed to respond to objects that interrupt the beam and then send a signal to the receiver 236. Other embodiments utilize optical sensors that are classified as "beam make" sensors that respond to objects such as the head 228 that reflect light from the emitter back to the receiver portion of the sensor 230. Either of these optical sensors may be used or other types of sensors may be used in the assembly 200 to monitor movement of the extension 220 to indirectly sense pawl and ratchet engagement. In one exemplary but not limiting implementation, an optical fork is used as sensor 230 such as the 45LST optical fork sensor available from Allen-Bradley.

Figure 3:
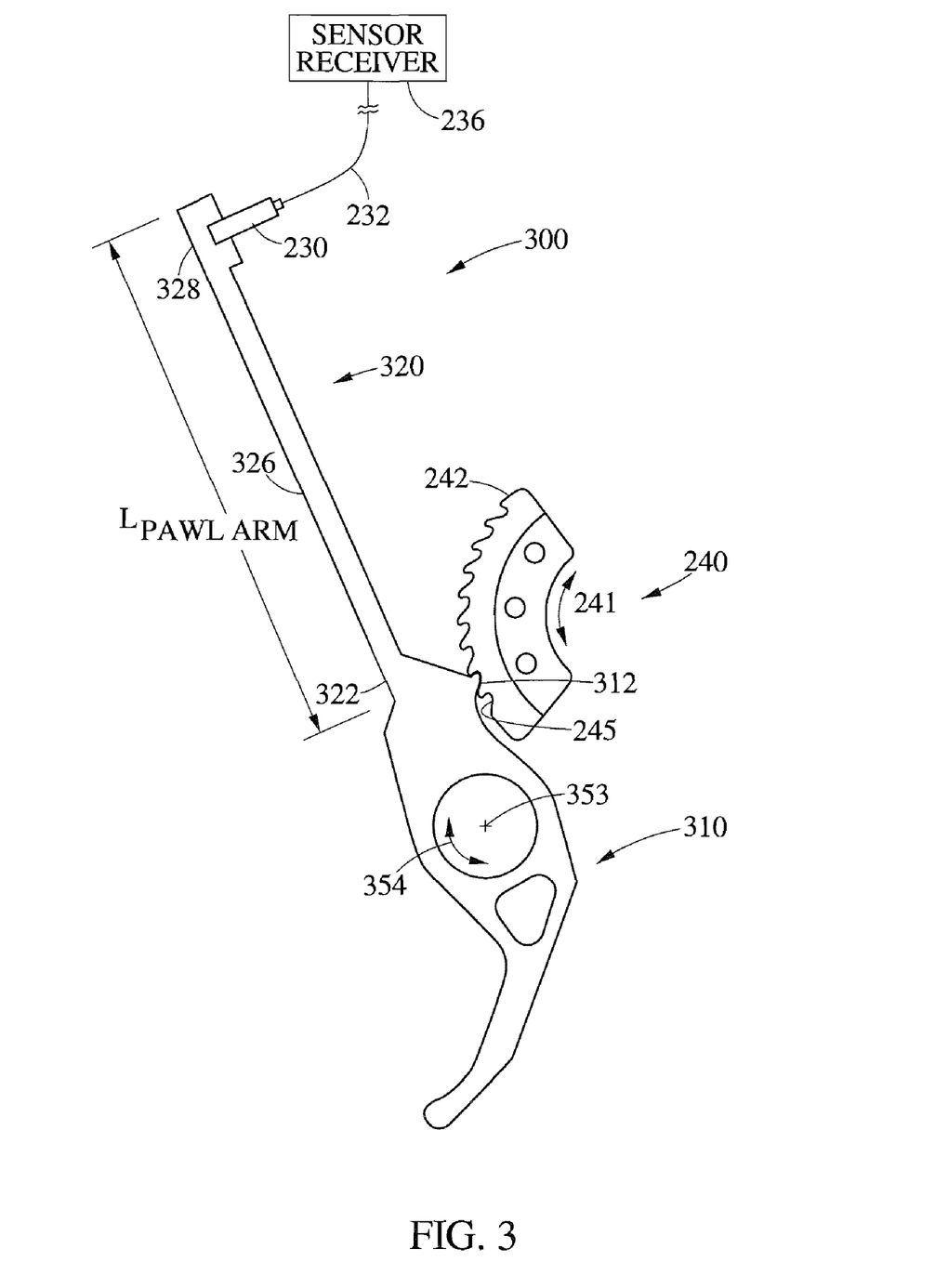
FIG. 3 illustrates a side view similar to FIG. 2A of a pawl and ratchet assembly according to the invention including a one piece pawl with a pawl extension or an arm extending outward form the pawl body at a differing angle than shown for the arm or extension of the assembly in FIG. 2A.

In FIGS. 2A and 2B, the extension or amplifier 220 was shown to be a separate component that was attached rigidly to the body of the pawl 210. Further, the extension was shown 220 to extend out at a particular angle, e.g., to extend outward perpendicularly to a plane containing the rotation axis 253 of the pawl and of the ratchet 240. As discussed, the configuration of the extension may be varied considerably to practice the invention and obtain a desired amplification and relocate the sensor target to a particular location relative to the pawl and/or ratchet. For example, FIG. 3 illustrates another pawl and ratchet assembly 300 according to the invention (with like numbered components of the ratchet 240 labeled with like numbers). As shown, the pawl 310 is mounted so as to rotate 354 about axis 353 (e.g., an axis of a shaft or pin) and to engage at tip or engaging portion 312 the teeth 244 of ratchet or ratchet wheel 240. In contrast to pawl and ratchet assembly 200, a pawl extension or pawl movement amplifier 320 is provided as an integral portion of the body of the pawl 310, which may be useful to reduce manufacturing costs. The extension 320 extends from its base (e.g., a portion of the body of the pawl 310) along its elongated arm or body 326 to a head or tip 328, which is monitored for movement by sensor 230. The arm or body 326 has a length, $L_{Pawl\ Arm}$, that provides a desired level of amplification such as a multiplier of 2 to 5 times or more. The arm 326 is also shown to extend outward from the body of the pawl 310 at a different angle than shown in FIGS. 2A and 2B to provide a differing relocation of the sensor target or head 328 relative to the pawl 310. Numerous other angles may be used to practice the invention with the embodiment 300 of FIG. 3 just being another example to be considered with embodiment 200 of FIGS. 2A and 2B.

Further, while the extension, amplifiers, or arms 220, 320 are shown to be substantially planar with the body of the pawl 310, it will be understood that the general concept of amplifying actual pawl tip 212, 312 movement at the extension tip 228, 328 (or other portion of the extension 220, 330) to allow indirect monitoring of another portion of the assembly 200, 300 may be practiced in other manners. For example, the extension or arm 220, 320 may extend obliquely outward from a plane passing through the pawl at right angles to the rotation axis 353. For example, an arm or extension 220, 320 that juts out transverse to a planar pawl body may be useful for selectively positioning the sensor target, which typically is the head 228, 328. With the teaching provided herein considered, many other techniques and designs of pawl and ratchet assemblies will be apparent to those skilled in the mechanical arts to achieve the amplification and target relocation aspects of the invention, and these other techniques and designs are considered within the breadth of this description.

As discussed, the pawl and ratchet assemblies of the present invention are well suited for use with passenger restraints such as those used in amusement park rides and attractions. Hence, it may be worthwhile to illustrate in more detail a locking or latching mechanism that is useful for passenger restraint systems such as the one shown in FIG. 1. For example, a restraint system for a thrill ride that generates significant g-forces including rapid acceleration that tends to lift a passenger out of their seat may benefit from the inclusion of the pawl and ratchet assemblies of the invention. In such rides, the restraint system may include seats that are mounted on a cage that moves up and down rapidly at speeds controlled by the ride control system (e.g., a tower-type ride may have multiple seats on a cage that is rapidly moved up and down vertically). An over-the-shoulder restraint arm may be initially in the raised position in which a passenger can sit down on the seat and in which the locking mechanism is disengaged. Then, prior to starting a next ride cycle, the restraint arm may be lowered to limit movement of the passenger in the seat, and the locking mechanism engages to secure the guest. Use of the indirect sensing techniques provided by pawl and ratchet assemblies of the invention enable such locking mechanisms and restraint systems incorporating these locking mechanisms to monitor proper operation of the locking mechanism to verify that the next ride cycle may be initiated by the ride control system.

Figure 4:
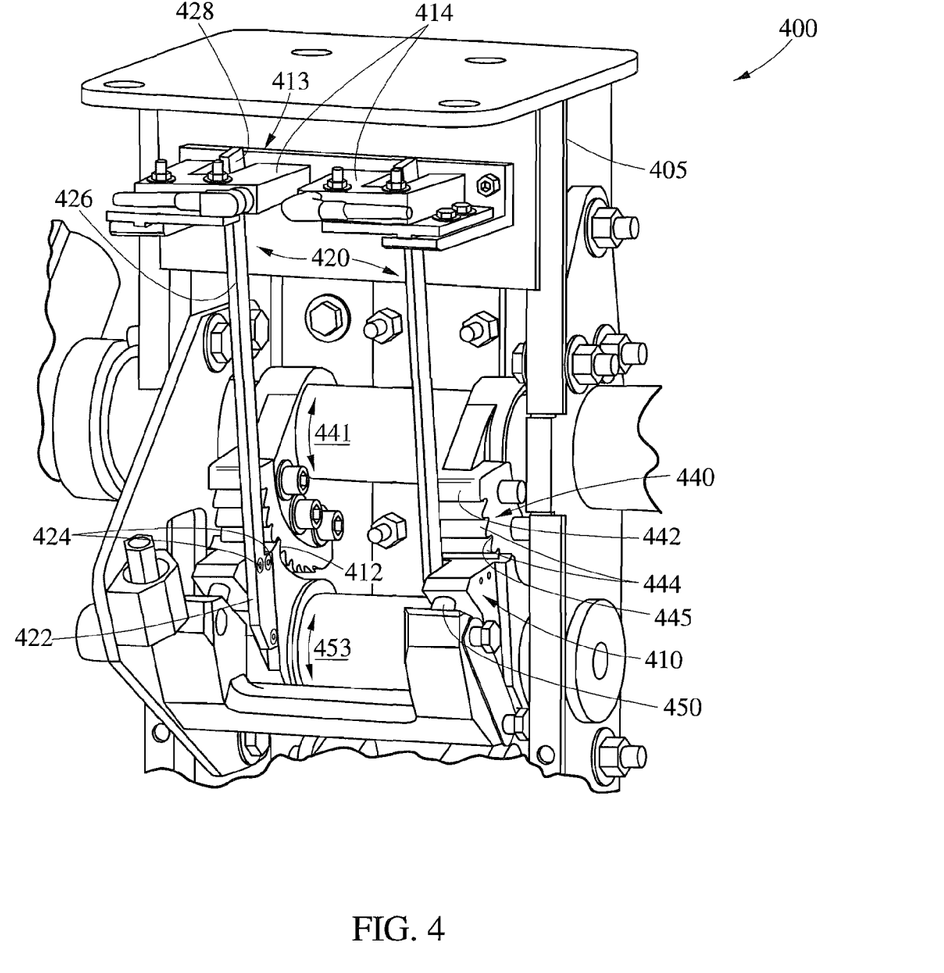
FIG. 4 is a perspective view of one embodiment of a locking or latching mechanism for a passenger restraint system as may be used in the system shown in FIG. 1 illustrating in more detail use of pawl extensions or arms such as those shown in FIGS. 2A-3.

FIG. 4 illustrates one such locking mechanism 400 that may be used with a passenger restraint such as that shown in FIG. 1 to allow indirect monitoring of a ratchet operation. As shown the locking mechanism 400 includes a housing or mounting structure 405 that may be provided on or as part of a back support. A sensor mount 413 is provided to support a pair of sensors 414 from which communication or signal lines extend to a sensor receiver unit (not shown). The sensors 414 are shown to be optical fork or similar sensors but other sensor configurations may be used to detect movement of the tip or heads 428 of a pair of pawl extensions or pawl travel amplifiers 420. The amplifiers 420 are mounted at their bases 422 to pawls 410 with fasteners 424 and extend upward from the pawls 410 the length of their bodies or arms 426 such that their tips or heads 428 extend into the fork sensors 414 at least in the illustrated engaged position. When the pawl 410 is taken out of engagement, the tips 428 may not extend into the sensors 414 or may extend into the sensors 414 but away from a light path (i.e., moved away from sensor light beams) so as to allow light beams to be emitted and received by the sensors 414 to indicate a particular monitored movement of tips 428.

Resilient members 450 are provided to urge or push the pawls 410 against the ratchets 440. In one embodiment, the members 450 are pawl springs that bias the pawls 410 upward such that engaging portions or tips 412 move between teeth 444 on the ratchet faces 442 into a recessed surface or valley 445. The pawls 410 are mounted onto shaft 453, which rotates in response to the biasing force applied by the resilient members 450 and in response to movement of the ratchets 440, whose teeth 444 contact the tips 412 of the pawls 410. The ratchets 440 rotate with shaft 441, which is linked to the restraints or restraint arms (not shown) to rotate in one direction when the restraint is being positioned into a locked position and in a second direction when the restraint is released. The pawl 410 engages the teeth 444 with the tips 412 to resist movement in the second direction while the ride or attraction is in its ride cycle to the point where the ride cycle and ride controller allow release of the restraints (e.g., the locking mechanism 400 is operated to unlock or release the restraint attached to the shaft 441). The use of the extensions or arms 420 allows the sensors 414 to be mounted distal to the ratchets 440 and pawl tips 412, and the size of the sensors 414 can be relatively large due to the relocation of the sensor targets or extension heads 428 away from the ratchet 440. As can be seen with this embodiment, it would be impractical due to physical constraints to attempt to position sensors similar to the sensors 414 proximate to the point of engagement between the pawls 410 and the ratchets 440 in the locking mechanism 400. Further, the travel of the tip 412 to engage the teeth 444 is likely smaller than the movement that can be detected by sensors 414, which without use of indirect sensing as described would require much higher precision sensors.

In the mechanism 400, the teeth 444 are used to push the pawl 410 away to allow the sensor 414 to monitor movement of the head 428 and test whether the pawl 410 returns properly to the engaged position. However, other methods may be used to allow the pawl 410 to move enough to demonstrate that the pawl 410 will engage the teeth 444 as shown. For example, a locking mechanism may be configured to move the gear 440 towards and away from the pawl 410 to force the pawl's motion in response to resilient members 450 (e.g., springs or the like).

Generally, pawl and ratchet assemblies described herein use sticks or other elongated members that are added to or provided as part of the pawl to amplify the motion of the pawl. This amplification of the pawl movement makes it possible to use normal industrial sensors and adjustment techniques to monitor pawl motion. The stick or extension moves more than the pawl tip or engaging portion moves so that there is a bigger difference between a full range of motion and a restricted range of motion, and due to this larger differential between normal and impeded travel of the extension or amplifier, there is a larger window for sensor adjustment and detection by a restraint monitoring module to detect failure and to find a range of proper engagement. For example, actual pawl tip travel may be between 0.12 and 0.13 during proper operation and engagement of a ratchet, and a sensor may need differential down to 0.01 inch or a similar range. In contrast, with amplification of about 4 times, the differential may be 4 times as large. This makes it practical to use normal industrial sensors and adjustment techniques to achieve acceptable accuracy.

The pawl and ratchet assembly in the locking mechanism 400 of FIG. 4 is configured such that the pawl 410 is weight balanced such that if the spring 450 is broken, the pawl 410 falls or drops away from the ratchet teeth 444 such as the next time the mechanism 400 is tested. This ensures that detection of a broken spring 450 occurs when the monitoring software or module detects that based on signals from the sensor 414 that the pawl 410 did not move in and out of the teeth 444 during movement of the restraint and ratchets 440 via linked or attached shaft 441. Instead of such a weight balancing arrangement, other mechanisms may be used that push or pull the pawl 410 away from the ratchet 440 when the biasing element 450 fails. For example, a magnet that is weaker in magnetic force than the force provided by the biasing element (e.g., its spring force or the like) may be utilized. Additionally, spinning the entire mechanism 400 to throw the pawl 410 away from the teeth 444 will work provided the spinning force is weaker than the force applied by a functioning bias element 450. In embodiments where the pawl 410 is gravity fed into contact with the ratchet, this additional testing function of the locking mechanism 400 is typically not included.

To detect wear of teeth 444 of the ratchet 440 or engaging member/portion 412 of the pawl 410, sensors 414 can be used to monitor that the pawl 440 gets pushed far enough out of the valley 445 in a manner similar to the way that the sensors 414 are used to monitor engagement travel into valley 445. In this manner, the operation of the pawl and ratchet assembly of locking mechanism 400 is further monitored. Such monitoring is useful because worn teeth or engaging members may result in the pawl 410 not being pushed out as far when the ratchet 440 rotates, and worn parts may result in improper engagement between the components. The extension 420 makes it easier to detect wear in a manner similar to detecting pawl travel during engagement as the greater or amplified range of motion of the head or tip 428 of the extension 420 allows implementation of the sensors 414 with conventional industrial sensors and adjustment techniques to achieve accepted accuracy levels.

Operation monitoring using a pawl and ratchet assembly of the invention may also include determining the magnitude of rotation of the ratchets 440 and linked shaft 441 (which may in turn be used to determine the position of the restraint linked to shaft 441). For example, counting of how many times the pawl 410 moves into and back out of the valleys 445 between the teeth 444 provides an indication of how much the ratchet 440 has been rotated, with the sensors 414 indirectly detecting this pawl motion by sensing movement of extension or amplifiers 420 and the controller or monitoring module performing the counting and conversion to rotation magnitudes and/or position of the restraint. In some embodiments, small back and forth movements of the ratchet 440 can lead to the sensor 414 detecting travel of the pawl 410, which can lead to a miscount and a misleading rotation determination. Hence, some embodiments of locking mechanisms 400 may utilize redundant ratchets in which the teeth of one ratchet are out of phase with the paired ratchet (e.g., 180 degrees out of phase) such that when the ratchet rotates with shaft 441, the two pawls 410 alternatively engage their paired ratchet 440, e.g., first one pawl engages then the next and so on. The sensors transmit signals alternately and the monitoring software only registers sustained motion in one direction when it determines that the pawls are alternating engagement in this manner. In other words, this out of phase arrangement for the ratchet teeth combines the signals from the sensors 414 (i.e., from the two ratchet/pawl combinations or pairs) into one, encoder-like signal that is processed by the controller or monitoring software.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the use of pawl and ratchet assemblies configured with indirect monitoring of engagement of the pawl with ratchet teeth has been discussed in detail for use in passenger restraint systems such as found in amusement park rides, motorized vehicles, and the like. The method of performing such indirect monitoring and the pawl and ratchet assemblies described herein may be used in many other applications where ratchets are employed such as tie downs, conveyor systems, winches, cranes, hoists, hand brakes, business machines, ski lifts, and many other applications where it is useful for determining whether a blocking mechanism such as a pawl with one or more protrusions, teeth, or raised surfaces has engaged a toothed element linked to a drive mechanism such as ratchet, a ratchet wheel, a gear, a sprocket, or the like (e.g., the use of the term "ratchet" is intended to be construed broadly to include nearly any component with recessed surfaces such as valleys between teeth or the like that moves radially or linearly relative to the blocking mechanism). The materials used for the ratchets, pawls, and extensions may vary to practice the invention with some embodiments utilizing metals such as steels and metal alloys selected for their structural strength and wear resistance for these components and with some embodiments using plastics or the like for the extensions which are not structural or force bearing components. In other applications such as business machines, the ratchets and/or pawls are made of plastic and/or other non-metallic material, as they do not bear large forces.

The above description and figures have focused attention on the amplification of the pawl movement, but the importance of the algorithmic portion of the described systems and methods will also readily be understood by those skilled in the art. As discussed, ride designers are typically unable to directly monitor that a pawl is fully engaged with a ratchet before starting a ride. The described monitoring systems and methods (e.g., algorithms) of the invention allow monitoring of a ratchet without requiring that the pawl actually be engaged at the start of the ride. With ratchets, one cannot monitor that the ratchet is locked before starting the ride, because ratchets do not lock but instead act to enforce one-way motion. Under newer ASTM standards, ride designers needed a way to monitor that each restraint will work before starting the ride otherwise the designers could not use ratchets in Class 5 restraints.

The inventors understood that it would be very difficult to monitor that the pawl was pressed into the valley or recessed surface of a ratchet because the restraint attached to the locking mechanism that included the pawl and ratchet assembly might not be positioned such that the pawl was in the valley. For example, the pawl could be near the top of a tooth. The inventors decided that instead of monitoring that a restraint is locked by monitoring that the pawl is fully pressed into the valley, it would be advantageous to provide a way to have a high degree of confidence that the pawl will fall or be pressed into the valley to prevent reverse motion when needed. To that end, the pawl and ratchet assemblies (or restraint systems such as system 100 of FIG. 1) are configured to monitor the behavior of the pawl during the "forward" motion of the ratchet to predict the behavior during reverse motion. Embodiments of the invention monitor the motion of the pawl over the ratchet teeth during forward motion to confirm that the pawl can be pushed into the valley or recessed surface of the ratchet. If a pawl is pushed into the valley during forward motion, the monitoring software determines that the restraint is working properly as there is a high confidence that the pawl will be pushed into the valley during reverse motion.

In prior restraint systems, to monitor, for example, that a seat belt tongue is locked in a seat belt receiver, the tongue was monitored to determine it is fully inserted in the receiver and that the latch has fully extended through the hole in the tongue. In essence, the passenger restraint systems acted to monitor that the seat belt is locked before proper operation was determined and, for example, a ride or piece of equipment was allowed to operate. However, with the use of a ratchet, such direct monitoring was not practical or even possible because the pawl and ratchet do not lock. A pawl and ratchet are configured to enforce one-way motion of the ratchet, and embodiments of the invention described herein provide a unique way to predict with confidence that the pawl will move freely or be properly displaced toward a ratchet to prevent reverse motion when needed of the ratchet. The monitoring concept or predictive algorithm allows the pawl and ratchet assemblies described herein to be used in Class 5 and other passenger restraint applications.

We claim:

1. An apparatus for monitoring operation of a ratchet-type locking mechanism, comprising:
   a ratchet with a recessed surface on a face;
   a pawl comprising a protrusion for engaging the ratchet during contact with the recessed surface;
   an elongated member extending outward from the pawl, the elongated member comprising a base linked to the pawl and a tip distal to the base, wherein the elongated member moves when the pawl protrusion is displaced relative to the recessed surface of the ratchet; and
   a sensor sensing displacement of the tip of the elongated member, wherein the displacement of the tip is greater than displacement of the pawl protrusion by an amplification factor of at least about 1.5.

2. The apparatus of claim 1, wherein the amplification factor is at least about 3.

3. The apparatus of claim 2, wherein the displacement of the pawl protrusion is less than about 0.25 inches.

4. The apparatus of claim 3, wherein the elongated member is at least 3 inches long, whereby the tip of the elongated member is spaced apart from the ratchet.

5. The apparatus of claim 1, further comprising a monitoring module running on a computer in communication with the sensor, wherein the sensor transmits a signal upon sensing the displacement of the tip of the elongated member and wherein the monitoring module detects the displacement of the protrusion of the pawl into the recessed surface of the ratchet based on the signal, whereby monitoring of the protrusion movement of the pawl to engage the ratchet is indirect.

6. The apparatus of claim 5, further comprising a biasing member urging the pawl into contact with the ratchet face and wherein the monitoring module identifies potential failure of the biasing member based on a lack of the signal from sensor during movement of the ratchet.

7. The apparatus of claim 1, wherein the ratchet has an arcuate face with a plurality of teeth and is rotated in two directions about a first rotation axis and wherein the pawl is rotated about a second rotation axis substantially parallel to the first rotation axis.

8. A passenger restraint system, comprising:
   a restraint positionable in an unlocked position and in a locked position;
   a ratchet mechanically linked to the restraint to move from a first position associated with the unlocked position to a second position associated with the locked position, wherein the ratchet comprises a plurality of teeth on a face;
   a pawl biased to engage the face of the ratchet with an engaging portion;
   an amplification arm extending a distance apart from a body of the pawl; and
   means for sensing movement of the amplification arm and, in response, generating an output signal.

9. The system of claim 8, wherein the sensed movement of the amplification arm is at least 1.5 times travel of the pawl.

10. The system of claim 9, wherein the travel of the pawl is displacement of a portion of the pawl engaging at least one of the teeth to provide a predefined amount of engagement between the pawl and the ratchet.

11. The system of claim 10, wherein the travel of the pawl is less than about 0.25 inches and the corresponding sensed movement for the amplification arm by the sensing means is at least about 3 times the travel of the pawl.

12. The system of claim 8, further comprising control means for processing the output signal from the sensing means to determine when the movement of the amplification arm corresponds to the pawl being able to engage the face of the ratchet with the engaging portion.

13. The system of claim 12, wherein the control means issues a control signal to prevent initiation of an operating cycle when the control means cannot determine that the pawl is able to engage the face of the ratchet.

14. The system of claim 11, wherein the distance that the amplification arm extends from the pawl is at least about 3 inches.

15. A method of monitoring operation of a pawl and ratchet assembly, comprising:

biasing a pawl toward a ratchet, wherein a first portion of the pawl engages a tooth of the ratchet when the first portion is displaced a first distance toward the ratchet;

monitoring a second portion of the pawl with a sensor to detect displacement of the second portion greater than a second distance, wherein the second distance is greater than the first distance; and generating a signal with the sensor when the monitoring detects displacement of the second portion greater than the second distance.

16. The method of claim 15, wherein the second portion of the pawl comprises an arm extending from a body of the pawl containing the first portion and wherein the arm has a length selected such that second distance is at least 50 percent greater than the first distance.

17. The method of claim 16, wherein the length of the arm is at least about 3 inches.

18. The method of claim 15, further comprising determining a failure to perform the biasing step based on a failure to receive the generated signal from the sensor.

19. The method of claim 15, further comprising counting the number of generated signals and determining a magnitude of movement of the ratchet based on the counted number.

* * * * *